E. D. WHITE.
TIRE PRESSURE GAGE.
APPLICATION FILED MAY 19, 1919.
1,345,570.  Patented July 6, 1920.
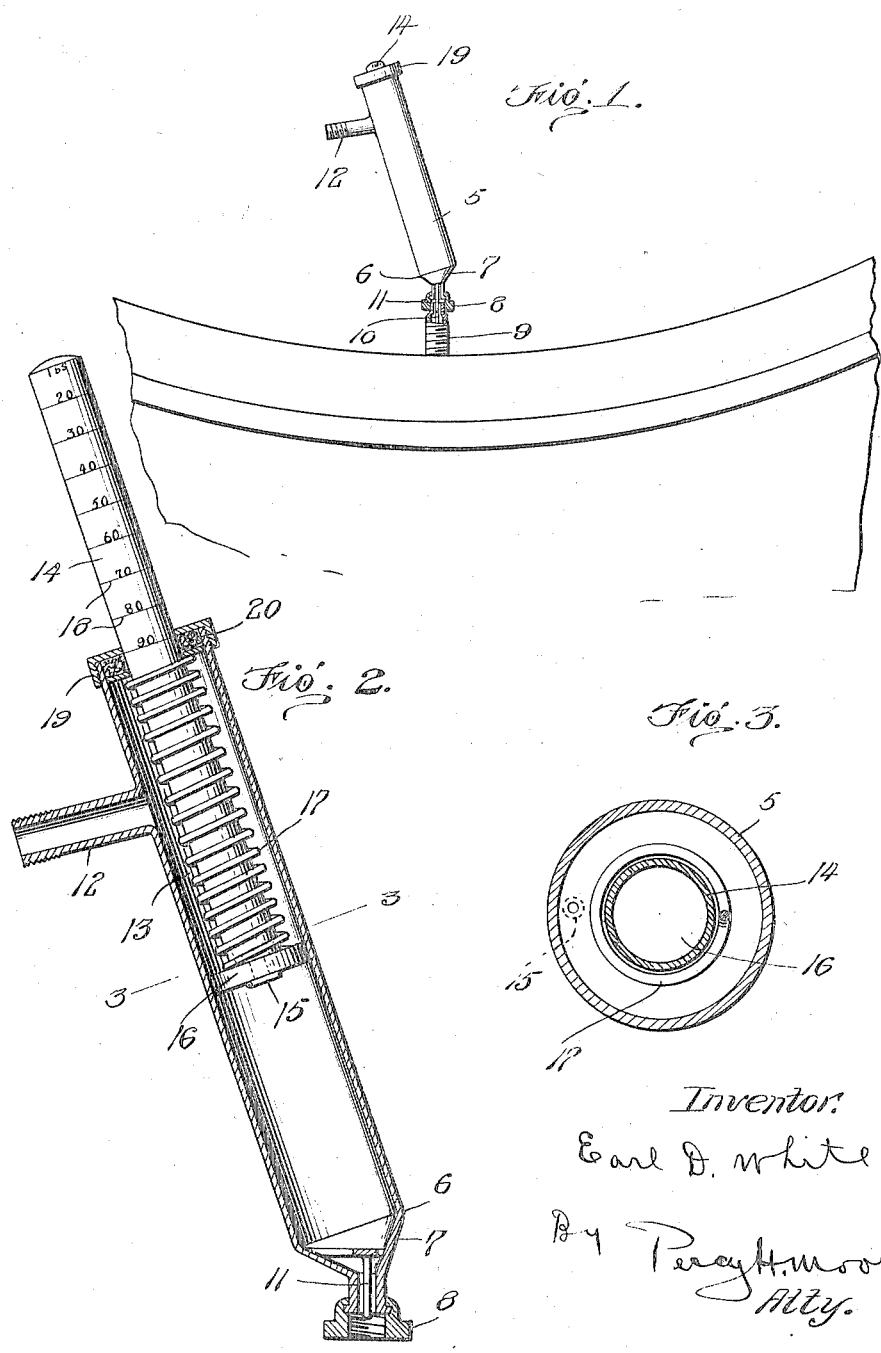
Inventor:
Earl D. White
By Percy H. Moore
Atty.

UNITED STATES PATENT OFFICE.

EARL D. WHITE, OF DELTA, COLORADO.

TIRE-PRESSURE GAGE.

1,345,570.  Specification of Letters Patent.  Patented July 6, 1920.

Application filed May 19, 1919. Serial No. 298,251.

*To all whom it may concern:*

Be it known that I, EARL D. WHITE, citizen of the United States of America, residing at Delta, in the county of Delta and State of Colorado, have invented certain new and useful Improvements in Tire-Pressure Gages, of which the following is a specification.

My invention relates to indicators primarily adapted for measuring the pressure in pneumatic tires.

The object of my invention is to provide a pressure indicator which will automatically register the pressure in a tire during the pumping or inflating operation.

With the above and other objects in view, my invention consists in the construction, combination and arrangement of parts, all as hereinafter more fully described, claimed and illustrated in the accompanying drawings, wherein:—

Figure 1 is a view in elevation, partly broken away showing my invention applied;

Fig. 2 is a longitudinal sectional view of the invention showing the gage extended, and Fig. 3 is a section on the line 3—3 of Fig. 2.

Referring more particularly to the drawings wherein like reference numerals denote corresponding parts throughout the several views, 5 is a hollow cylindrical body of light sheet metal containing a pressure indicator 14, to be described more fully hereinafter in connection with the operation of the device. The lower end 6 of the body 5 is provided with a contracted inclined extension 7 and this extension is provided with an internally screw threaded thumb nut 8, revoluble thereon, by means of which the cylindrical body may be attached to the tire nipple 9. In order that the valve 10 of the tire nipple 9 may be forced open and retained in open position when the thumb nut is screwed home, the extension 7 is provided with a pin 11. By inclining the extension 7 somewhat from the direction of the length of the member 5, the device, when attached to a tire nipple will be much more accessible.

The cylindrical member 5 is adapted to be connected either permanently or temporarily to the ordinary hand pump (not shown) by means of an externally threaded tubular member 12 extending at right angles from the member 5.

In use the thumb nut 8 is secured to the tire nipple and air forced through the tubular member 12 into and along the space 13 around the pressure indicator stem 14, thence through the check valve 15 formed in the plunger head or piston 16 and out through the extension 7 into the tire nipple. As the pressure in the tire being pumped rises, the pressure against the piston 16 causes the latter to rise against the tension of the coil spring 17. The end of the stem 14 opposite the piston 16, is provided with suitable graduations, 18 which can be readily read when the stem has been forced to protrude from the cylindrical body 5 by the pressure of air against the piston. A cap 19 and packing 20 prevents escape of the air.

The graduations 18 on the stem are designed to indicate a danger pressure of say ninety pounds when the piston 16 is forced outwardly by the pressure in the tire, as illustrated in Fig. 2.

Having thus described my invention:

What I claim is:

In a device of the class described, a hollow cylindrical body having a contracted inclined tubular extension, a spring pressed pressure indicator slidably mounted in said body, said indicator comprising a stem and piston, a check valve in said piston, means for connecting said body with a pump at a point above the normal downward limit of movement of said piston and means for connecting the tubular extension to a tire nipple.

In testimony whereof I affix my signature in presence of two witnesses.

EARL D. WHITE

Witnesses:
 N. WHITE,
 JOHN W. SMITH.